United States Patent Office 3,465,633
Patented Sept. 9, 1969

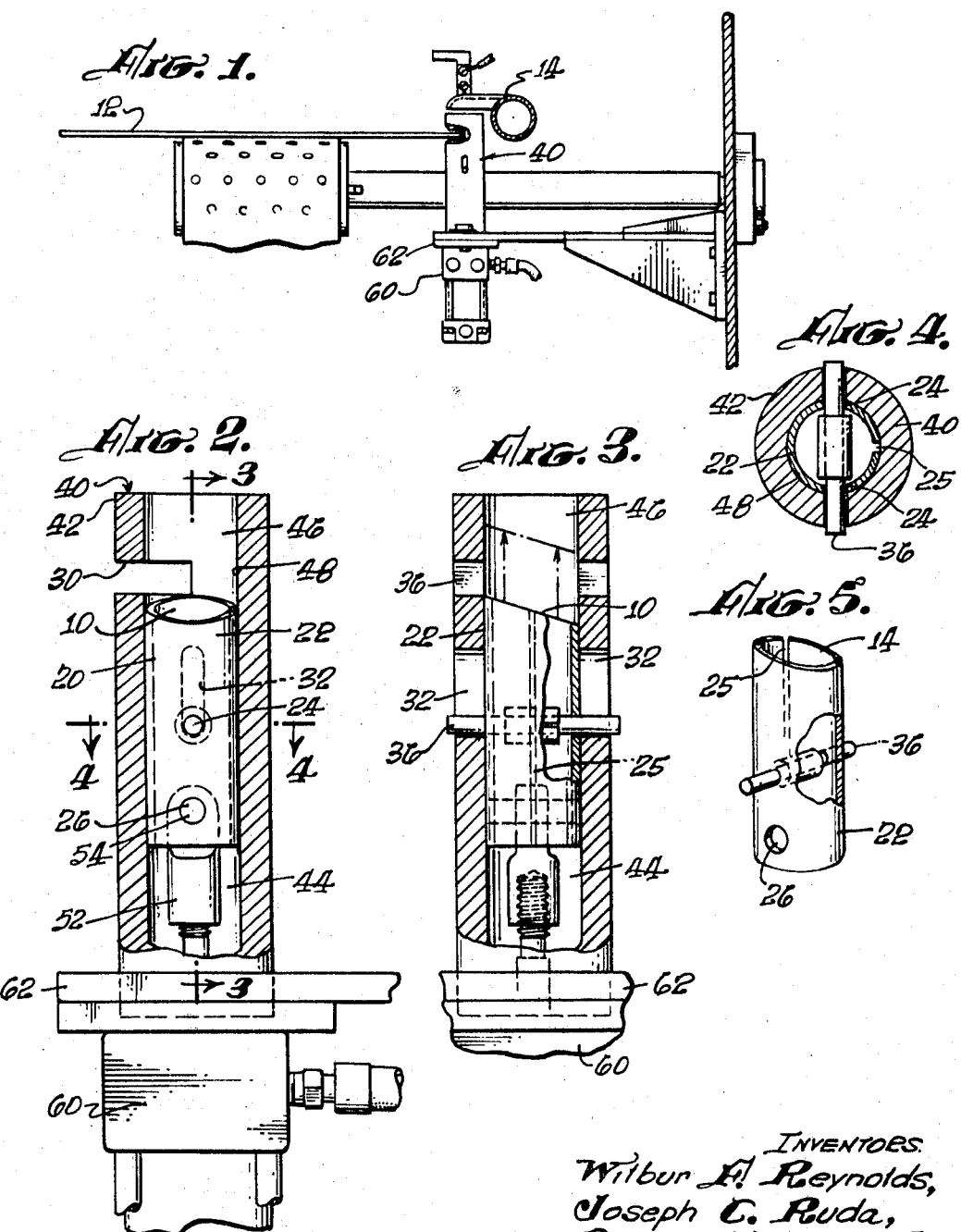

3,465,633
FILM PUNCH
Wilbur F. Reynolds, Scranton, Joseph C. Ruda, Clarks Green, and Bruno W. Marzani, Jr., Clarks Summit, Pa., assignors to Capitol Records, Inc., Hollywood, Calif., a corporation of California
Filed Dec. 21, 1967, Ser. No. 692,600
Int. Cl. B26F 1/14
U.S. Cl. 83—693                                    8 Claims

ABSTRACT OF THE DISCLOSURE

A punch apparatus comprising a housing section defining a slot adapted to receive a workpiece, and a split hollow cylinder piston means having a cutting edge coaxially disposed within the housing section.

BACKGROUND OF THE INVENTION

Field of the invention

The invention relates, in general, to an apparatus for effecting a shear in workpiece and more particularly to an apparatus for cutting very accurate apertures in thin layered material.

Description of the prior art

In the prior art there has been a lack of appreciation for a cutting device which will very accurately puncture and shear a thin layer of material. In the prior art the cutting device is not securely housed within its guide section. After continuous usage the clearance between the piston outside diameter and the housing section inside diameter becomes greater causing the piston cutter to be displaced from its original axial centerline which re-results in an extrusion of the thin layer of material rather than shear.

SUMMARY OF THE INVENTION

The invention is a film punch comprising a housing section defining a circumferential slot extending part way around the circumference of the housing section wall, and a split hollow cylinder piston coaxially disposed inside the housing section having a cutting edge.

The previous defects of the cutter are remedied by fabricating a piston cutter of a spring metal and shaping it into a split hollow cylinder having a circumference of less than 360°. The peripheral force exerted by the spring metal piston against the inside walls of the housing section reduces the clearance usually found between the piston outside diameter and the housing section inside diameter to a minimum. This technique is necessary to shear thin films in the .002 to .0004 inch thickness range.

BRIEF DESCRIPTION OF THE DRAWING

In the drawing:
FIGURE 1 is a general view showing how the present invention film punch assembly may be utilized;
FIGURE 2 is a cross sectional view of the housing section and a plan view of the split hollow cylinder piston means;
FIGURE 3 is a cross sectional view taken along lines 3—3 of FIGURE 2;
FIGURE 4 is a circular cross sectional view of the housing wall and piston wall taken at lines 4—4 of FIGURE 2, and a plan view of the piston means movement restrictor; and
FIGURE 5 is an exploded perspective of the split hollow cylinder piston.

DESCRIPTION OF THE PREFERRED EMBODIMENT

The invention is not limited to shearing films; it can be utilized for shearing any thin layered material such as polyethylene, cellophane or other thin plastic materials, used as a protective covering for perishable materials. It is especially suitable for shearing a small hole in phonographic record protective covers. This allows the sealed air to escape and maximizes storage space of the packaged product.

Referring now to FIGURE 2, the drive mechanism 60 may be comprised of any device which can impart reciprocating motion to a piston 20 coaxially disposed within a housing section 40. The drive mechanism 60, illustrated in FIGURE 2, is joined by a connecting rod 52 extending from the drive mechanism 60 to the piston 20. Connecting rod 52 is joined to the piston 20 by a connecting pin 54 passing through an aperture 26 in the piston wall 22.

The housing section 40 has a substantially circular cross section. One end of the housing section 40 is joined to the mounting section 62. The intersection of the plane perpendicular to the axial centerline of the housing section 40 at a predetermined distance from the mounted end of the housing section 40 with a 180° section of the housing section wall 42 defines a slot 30. The part of the housing section 40 adjacent to the mounted end 62 extending to the slot 30 is the guide section 44 and that part of the housing section 40 remote from the mounted end 62 extending to the slot 30 is the receiving section 46. Thus, the housing section 40 serves as both a piston guide 44 and a piston receiver 46.

The housing section 40 defines a pair of aligned apertures 32 of predetermined length through which a slidable rod member 36 can pass. The centerline of the aligned apertures 32 is parallel to the axial centerline of the housing section 40.

Coaxially disposed within the housing section 40 is a split hollow cylinder piston 20 having a circumference of less than 360° typically of the order of about 355°. However, slot opening 25 is not restricted to only 5°. FIGURE 5 shows the hollow cylinder walls 22 and the split 25. The split hollow cylinder piston 20 is fabricated from a spring metal and when shaped into a split cylinder 20, the piston wall 22 exerts an outward peripheral pressure against the inside housing section wall 48 reducing the clearance between the two surfaces to a minimum, thus, insuring that the piston 20 is always accurately aligned. It is within the scope of the invention to have a cutting piston capable of shearing film below the .0004 thickness range.

The end 10 of the piston 20 remotely disposed from the connecting rod 52 has a cutting edge 14. An oblique plane intersecting the split hollow cylinder piston wall 22 defines a cylindrical ellipse cutting surface 14.

The piston wall 22 defines a pair of aligned openings 24 having a circular cross section. The centerline of the aligned openings 24 is substantially perpendicular to the axial centerline of the piston 20. A rod member 36 having a cross sectional area substantially equal to the cross sectional area of the aligned openings 24 in the piston wall 22 and having a length greater than the outside diameter of the piston wall 22, extends through the cooperatively aligned rectangular apertures 32 in the guide section wall 42 and the circular cross sectional aligned openings 24 in the piston wall 22 to act as a piston movement restrictor. The width of the rectangular aligned apertures 32 in the guide section 44 in cooperation with the rod member 36 defines the movement of the piston 20. The length of the apertures 32 are approximately equal to the depth of the receiving section 46.

One illustrative method of utilizing the film punch is shown in FIGURE 1. The housing section 40 is attached to a shelf mounting 62. A reciprocating drive apparatus 60 imports reciprocating motion to the piston 20 urging the piston 20 from the guide section 44 to the receiving section 46. The cutting edge 10 passes through the semicircular slot 30 and shears a film wrapper 12 which has been inserted into slot 30. The outward force exerted by the piston means wall 22 because of its hollow split cylinder construction insures very accurate piston movement. A vacuum conveyance connection 64 may be mounted on the guide section end 46 to facilitate removal of the film residue.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. In an apparatus for performing a punching operation upon a workpiece, said apparatus comprising:
   a housing section, said housing section defining a slot extending circumferentially part way around the circumference of said housing, said slot being adapted to receive a workpiece; and
   a split hollow cylinder piston means, said means being disposed coaxially within said housing section, said piston means having a cutting edge.
2. In the combination defined in claim 1 wherein said housing section has a circular cross section, said housing section defining a horizontal slot extending circumferentially part way around the circumference of said housing.
3. In the combination defined by claim 2 wherein said split hollow cylinder piston means comprises a piston restrictor means adapted to prevent piston rotation within said cylindrical housing section.
4. In an apparatus for performing a punching operation upon a workpiece, said combination comprising:
   a cylindrical housing section, said cylindrical housing section serving as both a piston means guide and receiving section, said cylindrical housing section defining a slot, horizontal with respect to the centerline of said cylinder, in the wall of said cylindrical housing section adapted to receive a workpiece; and
   a split hollow cylinder piston means comprising a spring metal cylindrical member whose circumference is less than 360°, said split hollow cylinder piston means being slidably and snugly disposed within said cylindrical housing section by the outward peripheral force exerted by said spring metal, said split cylinder piston means having a cutting surface.
5. In the combination defined by claim 4 wherein said cylindrical housing section defines a pair of oppositely disposed substantially rectangular aligned apertures of predetermined length in said guide section, said apertures being adapted to using a slidable rod member passing therethrough.
6. In the combination defined in claim 5 wherein said split hollow cylinder piston means defines a pair of openings in opposite sides of said piston means wall, the centerline of said openings being perpendicular to the centerline of said piston means and adapted to receiving a rod member passing therethrough, said rod member being of greater length than said piston means diameter and extending through said aligned apertures in said housing section wall to act as a piston means movement restrictor.
7. In the combination defined in claim 4 wherein one end of said split hollow cylinder piston means defines a cylindrical elipse cutting surface said elipse being defined by the intersection of an oblique plane with said split hollow cylinder piston walls.
8. In an apparatus for performing a punching operation upon a thin layer of material a combination comprising:
   a cylindrical housing section, said housing section defining a slot having an arc of substantially $\pi$ radians, the plane defined by said arc being substantially perpendicular to the axial centerline of said housing section, said slot being adapted to receiving a thin layer of material such as a film, said cylindrical housing section serving as a piston means guide, and a piston means receiving section, said housing section defining a pair of oppositely disposed rectangular aligned apertures of predetermined length in said housing section wall, said aligned apertures having an axial centerline parallel to the axial centerline of said housing section, said apertures being adapted to receiving a slidable rod member passing therethrough;
   a split hollow cylinder piston means comprised of a spring metal, said piston means being disposed coaxially within said housing section, said piston means held snugly inside said housing section by the peripheral force exerted by said spring metal, said piston means defining a pair of aligned openings oppositely disposed in the walls of said split hollow cylinder, said apertures being adapted to receive a rod member passing therethrough, said rod member being of greater length than the diameter of said piston means and extending through said rectangular aligned apertures in said cylinder housing section wall acting as a piston means movement restrictor, said piston means having a cylinder ellipse cutting surface.

References Cited

UNITED STATES PATENTS

| | | | |
|---|---|---|---|
| 2,041,386 | 5/1936 | Laanen | 30—241 |
| 2,632,950 | 3/1953 | Hedstrom | 30—241 |
| 2,936,665 | 5/1960 | Naffin | 83—694 X |
| 3,120,143 | 2/1964 | Kreider | 83—693 X |

WILLIAM S. LAWSON, Primary Examiner

U.S. Cl. X.R.
30—241; 83—694